(12) United States Patent
Meisner et al.

(10) Patent No.: US 9,540,944 B2
(45) Date of Patent: Jan. 10, 2017

(54) REAL TIME MODEL BASED COMPRESSOR CONTROL

(71) Applicant: United Technologies Corporation, Hartford, CT (US)

(72) Inventors: Richard P. Meisner, Glastonbury, CT (US); Brian V. Winebrenner, Tolland, CT (US); Matthew R. Feulner, West Hartford, CT (US); Boris Karpman, Marlborough, CT (US); Juan A. Marcos, Middletown, CT (US); David L. Ma, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 1100 days.

(21) Appl. No.: 13/631,436

(22) Filed: Sep. 28, 2012

(65) Prior Publication Data

US 2014/0093350 A1    Apr. 3, 2014

(51) Int. Cl.
| | | |
|---|---|---|
| *F02C 9/52* | (2006.01) | |
| *F02C 9/18* | (2006.01) | |
| *F01D 17/00* | (2006.01) | |
| *F01D 17/08* | (2006.01) | |
| *F04D 27/00* | (2006.01) | |
| *F02C 9/54* | (2006.01) | |

(52) U.S. Cl.
CPC .............. *F01D 17/00* (2013.01); *F01D 17/08* (2013.01); *F02C 9/52* (2013.01); *F02C 9/54* (2013.01); *F04D 27/001* (2013.01); *F02C 9/18* (2013.01); *F05D 2270/101* (2013.01)

(58) Field of Classification Search
CPC ................ F02C 9/18; F02C 9/20; F02C 9/26; F02C 9/52; F02C 9/54; F05D 2270/101; F01D 17/00; F01D 17/08
See application file for complete search history.

(56) References Cited

U.S. PATENT DOCUMENTS

| | | | | |
|---|---|---|---|---|
| 3,882,672 A | * | 5/1975 | Bauerfeind | ................ 60/39.281 |
| 4,157,010 A | * | 6/1979 | Sailer | .............................. 60/774 |
| 4,606,191 A | * | 8/1986 | Collins et al. | ............. 60/39.281 |
| 4,813,226 A | * | 3/1989 | Grosselfinger et al. | ..... 60/39.25 |
| 4,825,639 A | | 5/1989 | Krukoski | |
| 4,991,389 A | * | 2/1991 | Schafer | ........................ 60/39.24 |

(Continued)

FOREIGN PATENT DOCUMENTS

| | | |
|---|---|---|
| EP | 1420153 A2 | 5/2004 |
| EP | 1811133 A2 | 7/2007 |

OTHER PUBLICATIONS

International Search Report and Written Opinion for PCT Application Serial No. PCT/US2013/061632; dated Jun. 25, 2014, 9 pages.

(Continued)

*Primary Examiner* — William H Rodriguez
(74) *Attorney, Agent, or Firm* — Kinney & Lange, P.A.

(57) ABSTRACT

A gas turbine engine comprises a compressor, a combustor, a turbine, and an electronic engine control system. The compressor, combustor, and turbine are arranged in flow series. The electronic engine control system is configured to generate a real-time estimate of compressor stall margin from an engine model, and command engine actuators to correct for the difference between the real time estimate of compressor stall margin and a required stall margin.

18 Claims, 4 Drawing Sheets

(56) References Cited

U.S. PATENT DOCUMENTS

| | | | |
|---|---|---|---|
| 5,042,245 A * | 8/1991 | Zickwolf, Jr. | 60/773 |
| 5,165,845 A | 11/1992 | Khalid | |
| 6,220,086 B1 * | 4/2001 | Andrew et al. | 73/112.06 |
| 6,364,602 B1 * | 4/2002 | Andrew et al. | 415/1 |
| 6,474,935 B1 * | 11/2002 | Crotty et al. | 415/1 |
| 6,506,010 B1 | 1/2003 | Yeung | |
| 6,823,675 B2 | 11/2004 | Brunell et al. | |
| 6,935,836 B2 * | 8/2005 | Ress et al. | 415/173.2 |
| 7,216,071 B2 | 5/2007 | Volponi | |
| 7,219,040 B2 | 5/2007 | Renou et al. | |
| 7,822,512 B2 | 10/2010 | Thatcher et al. | |
| 7,827,803 B1 * | 11/2010 | Wadia et al. | 60/772 |
| 7,837,429 B2 | 11/2010 | Zhang et al. | |
| 8,171,717 B2 | 5/2012 | Mosley et al. | |
| 8,185,291 B2 | 5/2012 | Nakakita et al. | |
| 8,215,095 B2 | 7/2012 | Mosely | |
| 8,322,145 B2 * | 12/2012 | Snider et al. | 60/779 |
| 2004/0123600 A1 | 7/2004 | Brunell et al. | |
| 2005/0193739 A1 | 9/2005 | Brunell et al. | |
| 2006/0101826 A1 * | 5/2006 | Martis et al. | 60/794 |
| 2008/0243352 A1 | 10/2008 | Healy | |
| 2010/0021285 A1 * | 1/2010 | Rowe et al. | 415/125 |
| 2010/0269481 A1 * | 10/2010 | Snider et al. | 60/39.24 |
| 2012/0060505 A1 | 3/2012 | Fuller et al. | |
| 2013/0236296 A1 * | 9/2013 | Collopy et al. | 415/162 |
| 2014/0090392 A1 * | 4/2014 | Meisner et al. | 60/773 |
| 2014/0090456 A1 * | 4/2014 | Meisner et al. | 73/112.01 |

OTHER PUBLICATIONS

Extended European Search Report for EP Application No. 13864686.4, dated Jul. 1, 2016, 7 pages.

\* cited by examiner

US 9,540,944 B2

REAL TIME MODEL BASED COMPRESSOR CONTROL

BACKGROUND

The present invention relates generally to gas turbine engine control, and more particularly to a method and system for model-based compressor control.

Modern Brayton and Ericsson cycle engines, including gas turbine engines for aircraft applications, continue to grow more complex. These engines require sophisticated control systems to handle increasing operational demands at reduced tolerances. Such engine control systems command engine actuators for control parameters such as fuel flow rate and variable engine geometries to achieve desired values of output parameters such as net thrust or engine rotor speed. A variety of control methods are currently used toward this end, including model-based control algorithms using predictive models that relate thermodynamic parameters such as flow rate, pressure, and temperature to input and output variables such as overall thrust, power output, or rotational energy.

Engine control systems are typically provided with a plurality of inputs including both current operating parameters and target parameters. Current operating parameters may include engine parameters such as rotor speeds, engine temperatures, and flow rates, as well as environmental parameters such as altitude and environmental air pressure and flow rate. Some current operating parameters are directly measured, while others may be fixed at manufacture or estimated based on measured parameters. Target parameters may include desired rotor speeds or net thrust values specified according to desired aircraft activities.

In addition to achieving specified target parameters, engine control systems are expected to avoid engine trajectories resulting in engine states that unduly reduce component lifetimes or increase likelihoods of undesired events such as engine surge, compressor stall, or engine blowout. Compressor stability, in particular, is maintained by controlling bleeds and variable stator vane angles to avoid compressor stall or lean blowout conditions.

Engine control systems maintain a stall margin, a minimum distance between a compressor operating point (i.e. compressor pressure ratio and flow) and a predicted stall line corresponding to compressor stall conditions. Conventional systems rely on lookup tables generated offline from steady-state engine models with entries corresponding to expected pressure ratio targets selected to avoid stall conditions by at least a "stall margin," a tolerance margin chosen to minimize risk of stall. The more accurate and precise the prediction of stall conditions, the narrower the stall margin may be. Improvements in stall margin estimation allow improved engine efficiency by reducing the operating stall margin.

SUMMARY

The present invention is directed toward a gas turbine engine comprising a compressor, a combustor, a turbine, and an electronic engine control system. The compressor, combustor, and turbine are arranged in flow series. The electronic engine control system is configured to generate a real-time estimate of compressor stall margin from an engine model, and command engine actuators to correct for the difference between the real time estimate of compressor stall margin and a required stall margin.

DETAILED DESCRIPTION

Figure 1:
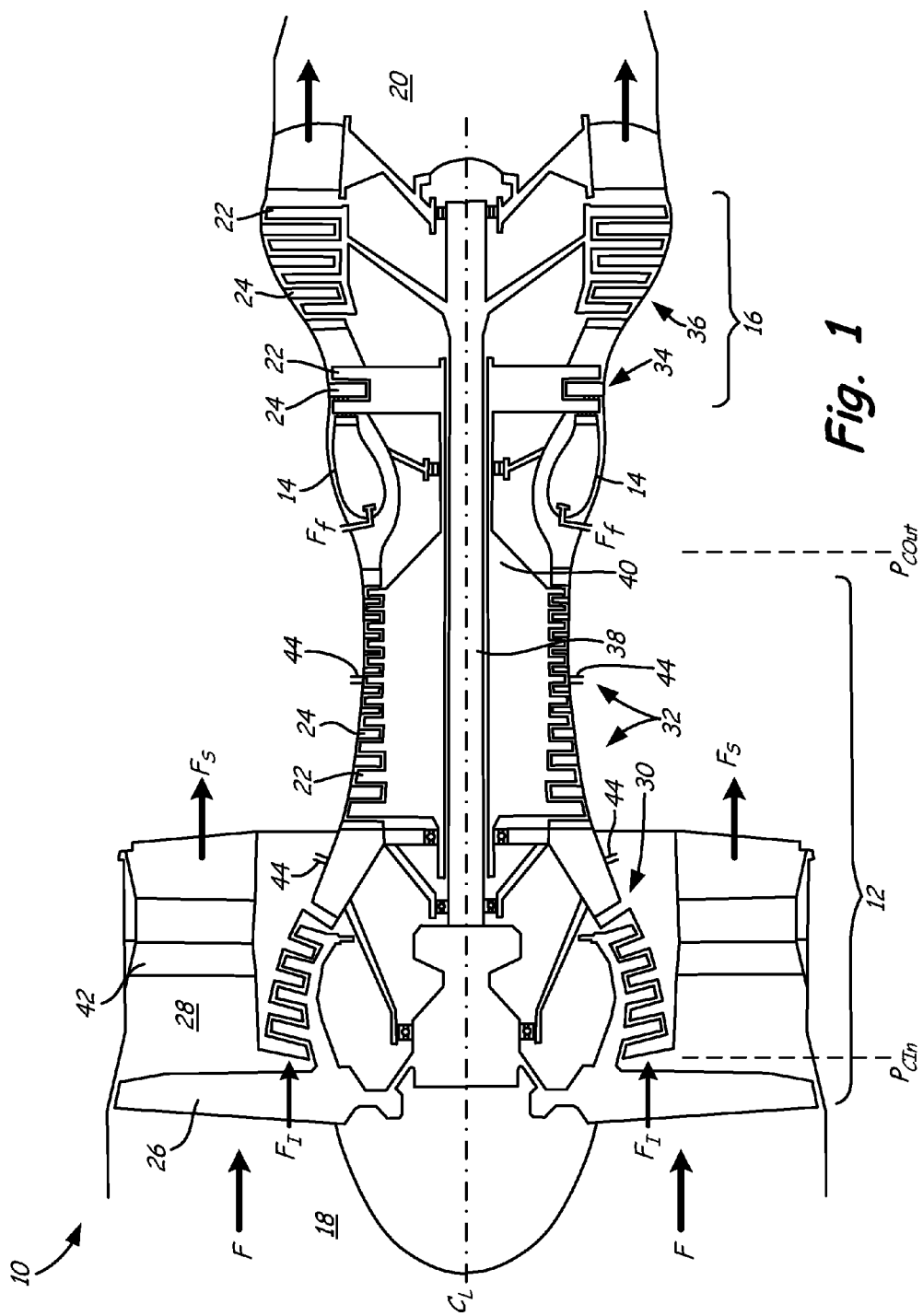
FIG. 1 is a simplified cross-sectional view of a gas turbine engine.

FIG. 1 is a simplified cross-sectional view of gas turbine engine 10. Gas turbine engine 10 comprises compressor section 12, combustor 14, and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also be provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool. Compressor section 12 includes a plurality of bleed valves 44 to bleed excess pressure to avoid compressor stall. Bleed valves 44 may, for instance, be located between LPC 30 and HPC 32, and at an intermediate location within HPC 32. Although two stages of bleed valves 44 are shown in FIG. 1, some embodiments of the present invention may have more or fewer bleed valves.

Flow F at inlet 18 divides into inlet flow $F_I$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

LPC 30 receives and compresses inlet flow $F_I$. Although some of inlet flow $F_I$ may be bled off of LPC 30, for cooling or to reduce pressure, most continues to and is compressed by HPC 32, then mixed with fuel in combustor 14 and ignited to generate hot combustion gas. Fuel is supplied to combustor at a metered flow $F_f$. The combustion gas expands to provide rotational energy in HPT 34 and LPT 36, driving HPC 32 and LPC 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. Fan rotor 26 may also function as a first-stage compressor for gas turbine engine 10, and LPC 30 may be configured as an intermediate compressor or booster. Gas turbine engine 10 may be embodied in a wide range of different shaft, spool and turbine engine configurations, including one, two and three-spool turboprop and (high or low bypass) turbofan engines, turboshaft engines, turbojet engines, and multi-spool industrial gas turbines.

The efficiency and performance of gas turbine engine 10 depend on the overall pressure ratio PR of combustor section 12, defined as the total pressure at inlet 18 as compared to the exit pressure of compressor section 12, for example at the outlet of high pressure compressor 32, entering combustor 14. Higher pressure ratio generally corresponds with higher engine power, but pressure ratio exceeding a stable airflow limit can result in compressor stall, particularly if sustained. Compressor stall—the stall of rotor airfoils 22 of compressor section 12—results in a loss of compressor performance that can vary widely in severity, from a slight or momentary drop in compressor airflow and engine power to a complete loss of compression and catastrophic blowback (known as engine surge). The pressure ratio PR at which stall occurs is a function of compressor inlet flow $F_I$, tip clearance, heat transfer rates, the position of stator vanes 24 of compressor section 12, and other engine parameters, including external and environmental parameters (see, e.g. FIG. 4 and accompanying description, below).

As noted above, compressor section 12 includes a plurality of alternating axial stages of rotor airfoils 22 and stator vanes 24. At least some of stator vanes 24 are variable vanes with controllable angle-of-attack that can be adjusted to alleviate stall conditions at particular locations within compressor section 12. To avoid and recover from stall conditions, the present invention incorporates an electronic engine control system with a compressor control system (compressor control system 100; see FIG. 2 and accompanying description, below) that estimates the current engine operating point in coordinates of compressor inlet flow $F_I$ and compressor pressure ratio PR, and estimates a stall line defining the relationship between inlet flow and compressor pressure ratio corresponding to stall risk. Compressor control system 100 uses these estimated values to adjust a stall margin in real time. Compressor control system 100 avoids and recovers from stall conditions by opening bleed valves 44 and closing variable stator vanes 24 as needed to reduce compressor blade angle of attack in compressor section 12. Opening bleed valves 44 dumps compressed air from compressor section 12, thus wasting energy and reducing the overall efficiency of gas turbine engine 10. Flow compensation with variable stator vanes is thus generally preferred, where possible, over opening bleed valves 44. In some embodiments, compressor control system 100 may also avoid stall by reducing fuel flow $F_f$, thereby reducing backpressure in compressor section 12.

Figure 2:
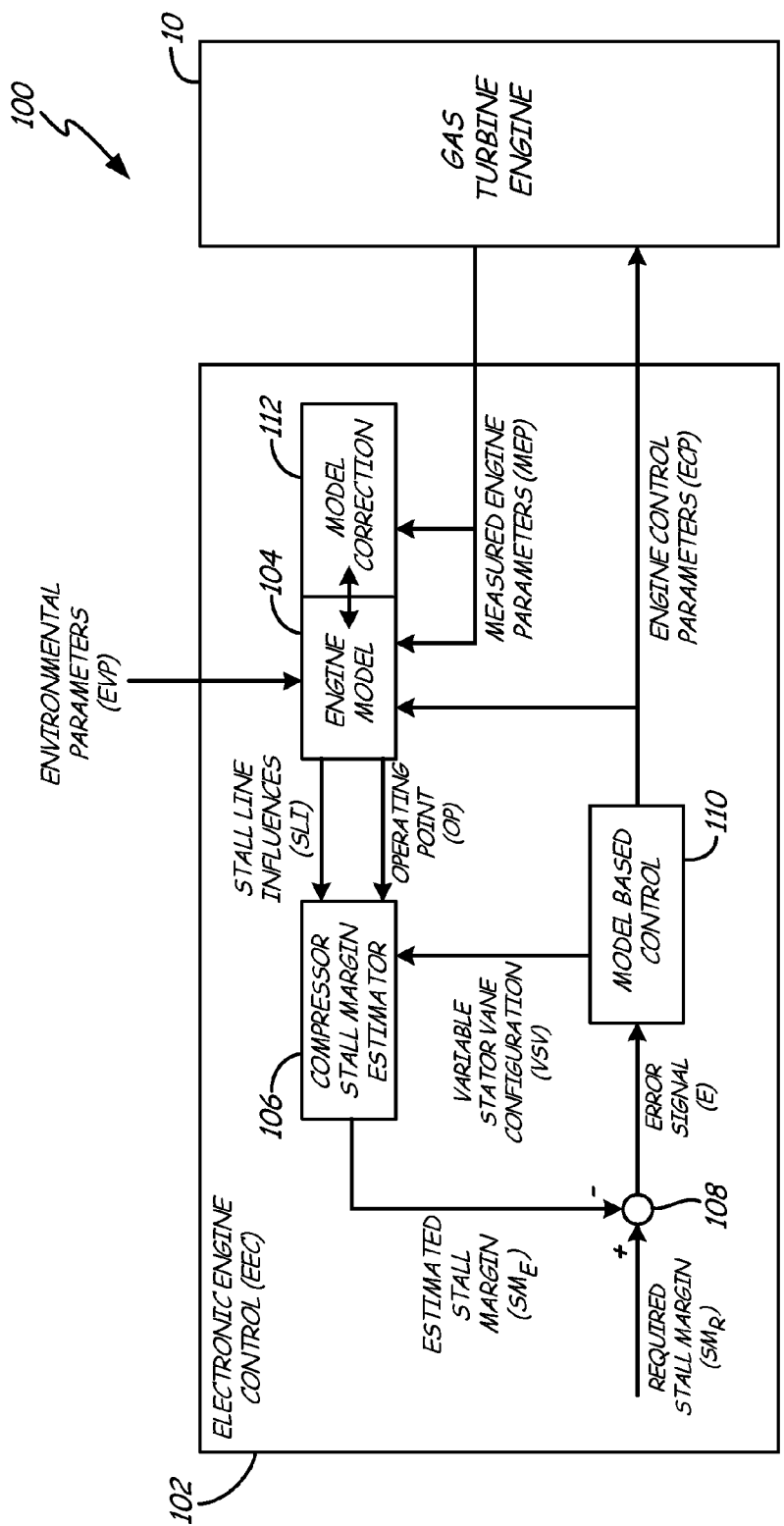
FIG. 2 is a schematic block diagram of a compressor control system for the gas turbine engine of FIG. 1.

FIG. 2 is a schematic block diagram of compressor control system 100, comprising gas turbine engine 10 and electronic engine control 102 with engine model 104, compressor stall margin estimator 106, difference block 108, model based control block 110, and model correction 112. As described above with respect to FIG. 1, compressor control system 100 allows compressor section 12 to avoid and recover from stall conditions. The logic flow paths indicated in FIG. 2 reflect one time step in an iteratively repeating real time control process.

Electronic engine control system 102 is a digital controller that commands actuators of gas turbine engine 10 based on a specified stall margin, measured engine parameters MEP, and environmental parameters EVP. In particular, electronic engine control system 102 commands actuators for variable stator vanes, bleed valve actuators, and fuel flow actuators via engine control parameters ECP. Model-based control system 102 also utilizes calibration parameters (not shown) which are set at manufacture or during maintenance, and which do not vary substantially during engine operation. Measured engine parameters MEP may, for instance, include rotor speeds and sensed pressures and temperatures at inlet 18 of LPC 30 and at the outlet of HPC 32 into combustor 14.

Electronic engine control system 102 is comprised of five sections: engine model 104, compressor stall margin estimator 106, difference block 108, model based control block 110, and model correction 112. These logic blocks represent distinct processes performed by electronic engine control 102, but may share common hardware. In particular, engine model 104, compressor stall margin estimator 106, model based control block 110, and model correction 112 may be logically separable software algorithms running on a shared processor or multiple parallel processors of a full authority digital engine controller (FADEC) or other computing device. This device may be a dedicated computer, or a computer shared with other control functions for gas turbine engine 10.

Engine model 104 is a logical block incorporating a model of gas turbine engine 10. In some embodiments, engine model 104 may be a component-level model describing only compressor section 12. In other embodiments, engine model 104 may be a system-level model describing the entirety of gas turbine engine 10. Engine model 104 may, for instance, be constructed based on the assumption that specific heats and gas constants within gas turbine engine 10 remain constant over one timestep. Similarly, engine model 104 may incorporate simplifying assumptions that unaccounted pressure losses across gas turbine engine 10 and torque produced by cooling bleed mass flow are negligible. The particular simplifying assumptions used by engine model 104 are selected for high accuracy during normal modes of operation of gas turbine engine 10, and may not hold during some exceptional operating conditions such as engine surge.

Engine model 104 produces an estimate of current operating point OP of compressor section 12, and of a current compressor stall line influences SLI from environmental parameter EVP, engine measured engine parameters MEP, and engine control parameters ECP corresponding to a previous iteration of the logic process of compressor control system 100. Operating point OP may, for instance, be a two-coordinate point comprising current compressor inlet flow $F_I$ and current compressor pressure ratio PR. In alternative embodiments, the operating point OP may be a one-coordinate point combining current compressor inlet flow $F_I$, current compressor pressure ratio PR, and current compressor temperature ratio TR into a parameter which correlates well with compressor stall margin such as exit corrected flow, which is proportional to inlet flow multiplied by the square root of compressor temperature ratio TR divided by compressor pressure ratio PR. Stall line influences SLI are engine parameters with substantial influence on the compressor stall line SL. Stall line SL describes the relationship between inlet flow $F_I$ and stall pressure ratio, which may, for instance, be very roughly linear. For an example stall line SL and operating point OP, see FIG. 4 and accompanying description. Stall line influences SLI may include tip clearances of rotor 22 and/or stator 24 in compressor section 12, variable stator vane angles, and heat transfer rates between gas and casing/blade/vane material in compressor section 12.

Compressor stall margin estimator 106 produces estimated stall margin $SM_E$ from stall line influences SLI and operating point OP. Estimated stall margin $SM_E$ is the estimated current pressure ratio difference between operating point OP and the point on stall line SL with corresponding compressor inlet flow $F_I$. Compressor stall margin estimator 106 first estimates a current stall line SL based on stall line influences SLI, then produces estimated stall margin $SM_E$ by comparing operating point OP with stall line SL. Difference block 108 takes the difference between estimated stall margin $SM_E$ and required stall margin $SM_R$ to produce error E. Required stall margin $SM_R$ is a specified target stall margin selected to avoid compressor stall. Required stall margin $SM_R$ may, for instance, be drawn from a lookup table, or computed using engine model 104.

Model based control block 110 commands actuators of gas turbine engine 10 via engine control parameters ECP, based on error E. Engine control parameters ECP are selected to correct for error E, increasing or decreasing airflow and pressure ratio PR to approach required stall margin $SM_R$. Engine control parameters ECP are received by actuators in gas turbine engine 10, including actuators of bleed valves 44, variable stator vanes 24, and fuel flow actuators. Engine control parameters ECP are also received by engine model 104 in preparation for a next timestep. Model correction 112 updates engine model 104 for the next timestep, correcting for gradual drift due and deterioration of gas turbine engine 10. With the aid of model correction block 112, the approximation provided engine model 104 converges on actual engine behavior sufficiently quickly to ensure that the model remains a good predictor of actual engine values, but sufficiently slowly to avoid tracking noise in measured engine parameters MEP and environmental parameter EVP.

Figure 3:
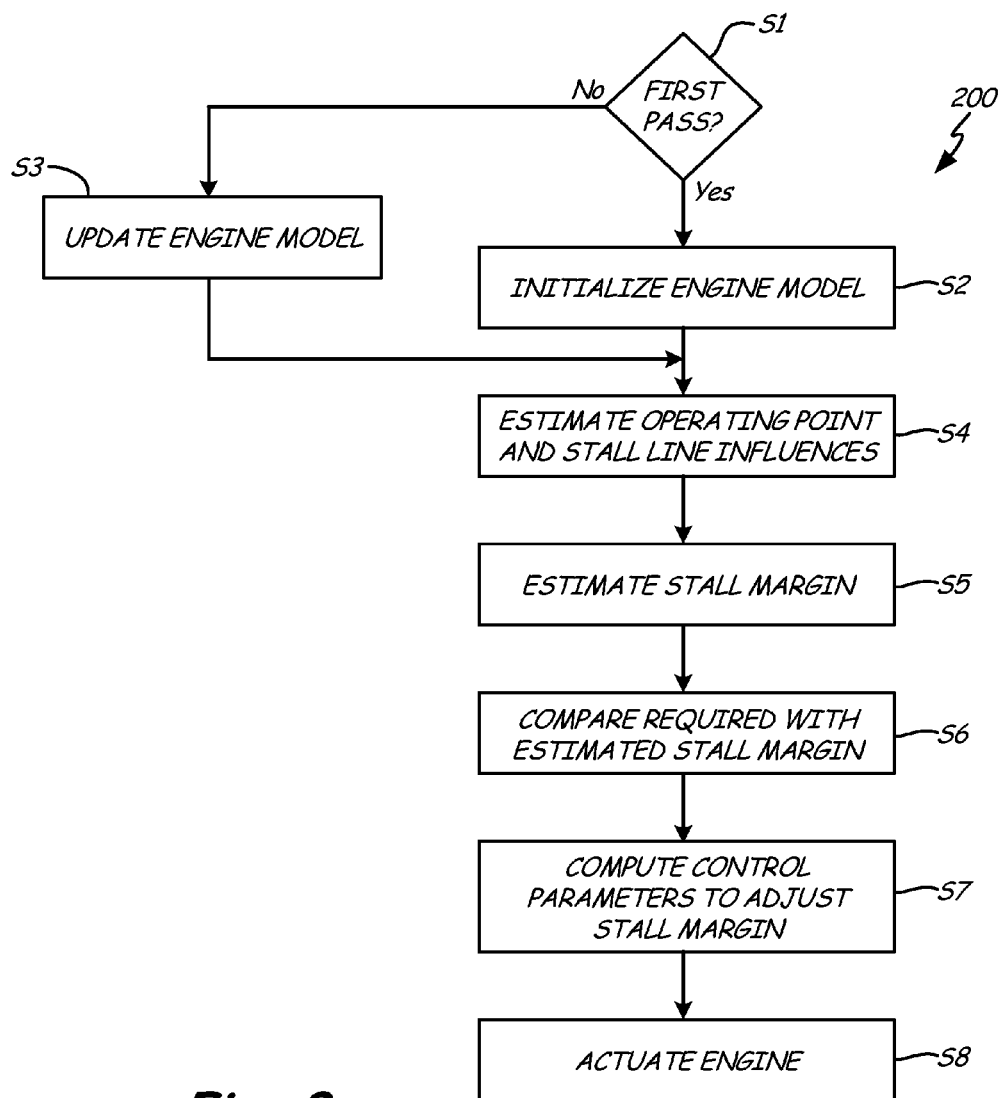
FIG. 3 is a flowchart of a method performed by the compressor control system of FIG. 2.

FIG. 3 is a flowchart of control method 300, an exemplary method carried out by compressor control system 100 to avoid and recover from compressor stall. Control method 300 may be repeated many times during operation of compressor control system 100. Method 300 differentiates between first and subsequent passes. (Step S1). In the first iteration of method 300, engine model 104 is initialized using measured engine parameters MEP and control values corresponding to a default actuator state of gas turbine engine 10. (Step S2). In subsequent iterations of method 300, engine model 104 is updated using engine control parameters ECP produced in previous iterations. (Step S3). Engine model 102 estimates operating point OP and stall line influences SLI in real time. (Step S4). Compressor stall margin estimator 106 uses operating point OP and stall line influences SLI to produce estimated stall margin $SM_E$, a real time estimate of the current distance between operating point OP and stall line SL. (Step S5). Difference block 108 produces error E by comparing estimated stall margin $SM_E$ with an required stall margin $SM_R$. (Step S6). Model based control block 110 computes engine control parameters ECP to correct for error E. (Step S7). Finally, engine control parameters ECP are used both to actuate fuel flow rate, bleed valves 44, and variable stator vane 24 geometries in compressor section 12. (Step S8)

Figure 4:
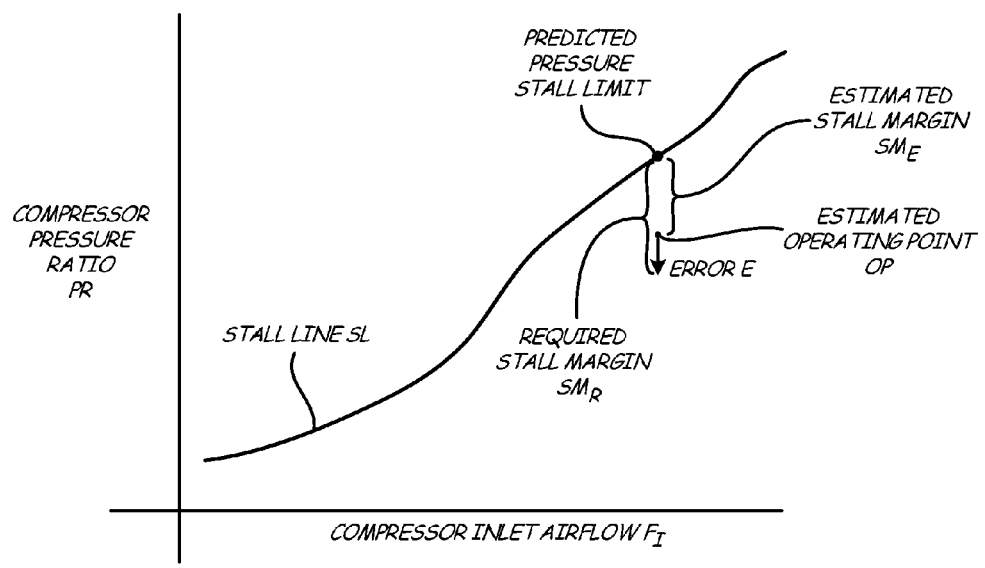
FIG. 4 is a graph illustrating an example compressor stall line, operating point, and stall margin.

FIG. 4 is a graph illustrating compressor stall line SL, estimated operating point OP, estimated stall margin $SM_E$, required stall margin $SM_R$, and error E. FIG. 4 is shown by way of example only, and is not drawn to scale. Stall line SL corresponds to a predicted relationship between compressor inlet airflow $F_I$ and a stall pressure ratio. Stall line SL also depends on stall line influences SLI, as described above with respect to FIG. 2. Compressor pressure ratios above stall line SL correspond to stall conditions. Estimated operating point OP is an estimate of current compressor pressure ratio PR and inlet airflow $F_I$, as described above. For a given operating point OP, the predicted pressure stall limit is the point on stall line SL corresponding to compressor inlet airflow $F_I$. The vertical distance between estimated operating point OP and stall line SL is estimated stall margin $SM_E$. Comparing estimated stall margin $SM_E$ with required stall margin $SM_R$ yields error E. In the illustrated embodiment, estimated operating point OP indicates compressor pressure ratio PR is too high, and error E accordingly requires a downward correction to compressor pressure ratio PR. In alternative embodiments, estimated stall margin $SM_E$, required stall margin $SM_R$, and error E may be expressed as a percentage of the operating point.

Compressor control system 100 provides a real time estimate of stall margin SM from real time estimates of operating point OP and stall line SL. This estimated stall margin $SM_E$ is used to correct actuator states such as variable stator vane geometries and bleed valve states so as to closely follow a required stall margin. Estimated stall margin $SM_E$ provides a more precise tool for stall avoidance and correction than conventional lookup methods. This increased accuracy means that required stall margin $SM_R$ can be relatively small, improving overall engine efficiency and power without risk of compressor stall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
    a compressor, combustor, and turbine in flow series;
    an electronic engine control system configured to generate a real-time estimate of compressor stall margin from an engine model, and command engine actuators to correct for a difference between the real time estimate of compressor stall margin and a required stall margin;
    wherein the electronic engine control system generates the real time estimate of compressor stall margin by estimating stall line influences and a compressor operating point from the engine model, and calculating a pressure ratio distance separating the compressor operating point from a stall line estimated based on the stall line influences.

2. The gas turbine engine of claim 1, wherein the engine actuators include bleed valves situated within the compressor.

3. The gas turbine engine of claim 1, wherein the engine actuators include actuators that control the angle of attack of at least some variable geometry stator vanes within the compressor.

4. The gas turbine engine of claim 1, wherein the engine actuators include fuel flow actuators that control the rate of fuel flow into the combustor.

5. The gas turbine engine of claim 1, wherein the operating point has coordinates of compressor inlet flow and compressor pressure ratio.

6. A control system for a compressor of a gas turbine engine, the control system comprising:

an engine model configured to estimate stall line influences and a compressor operating point in real time based on sensed environmental and engine parameters;
a compressor stall margin estimator configured to estimate a stall line based on the stall line influences, and estimate a current compressor stall margin based on distance between the estimated compressor operating point and the estimated stall line; and
a model based control block configured to control actuators of the gas turbine engine so as to correct for deviation of the estimated stall margin from a required stall margin;
wherein the estimate of a current compressor stall margin further comprises determining a pressure ratio distance between the estimated compressor operating point and the estimated stall line based on the stall line influences.

7. The control system of claim 6, further comprising a difference block configured to produce an error equal to the difference between the estimated stall margin and the required stall margin, and wherein the model based control block controls actuators based on the error.

8. The control system of claim 6, wherein the engine model receives engine control parameters from the model based control block, and updates based for a next time step based on the engine control parameters.

9. The control system of claim 6, wherein the control system further comprises a model correction configured to update the engine model based on changes in measured parameters.

10. The control system of claim 9, wherein the model correction operates on a timescale selected to avoid contaminating the engine model with transient noise in measured engine parameters.

11. The control system of claim 9, wherein the actuators include at least one of actuators for variable geometry stator vanes, compressor bleed valves, and fuel flow rate actuators.

12. The control system of claim 6, wherein the stall line influences comprise at least one of tip clearances between rotating and non-rotating components in the compressor, and heat transfer rates between gas and casing material of the compressor.

13. The control system of claim 6, wherein the operating point has coordinates of compressor inlet flow and compressor pressure ratio.

14. A method for controlling a gas turbine engine to avoid and recover from stall, the method comprising:
estimating current stall line influences and a current compressor operating point from measured engine parameters, environmental parameters, and an engine model;
producing a real time stall margin estimate based on the stall line influences and the compressor operating point;
setting engine control parameters based on the real time estimated stall margin;
controlling actuators of the gas turbine engine based on the engine control parameters; and
updating the engine model based on the engine control parameters;
wherein producing the real time stall margin estimate comprises determining a pressure ratio distance between the compressor operating point and an estimated stall line based on the stall line influences.

15. The method of claim 14, wherein setting engine control parameters based on the real time estimated stall margin comprises selecting engine control parameters to correct for an error between the estimated stall margin and a required stall margin selected to avoid compressor stall.

16. The method of claim 14, wherein actuating the gas turbine engine based on the engine control parameters comprises actuating variable geometry stator vanes to avoid stall, and opening compressor bleed valves if the variable geometry stator vane adjustment is constrained such that it is insufficient to avoid potential stall conditions.

17. The method of claim 16, wherein actuating the gas turbine engine based on the engine control parameters further comprises controlling fuel flow rates into a combustor of the gas turbine engine to avoid stall by reducing backpressure from the combustor.

18. The method of claim 14, further comprising updating the engine model with a model correction based on changes in measured engine parameters.

* * * * *